United States Patent
Kakimoto

(10) Patent No.: US 10,300,632 B2
(45) Date of Patent: May 28, 2019

(54) METHOD OF PRODUCING PREFORM

(71) Applicant: Mitsubishi Chemical Corporation, Tokyo (JP)

(72) Inventor: Yoshihide Kakimoto, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 366 days.

(21) Appl. No.: 14/438,802

(22) PCT Filed: Oct. 30, 2013

(86) PCT No.: PCT/JP2013/079353
§ 371 (c)(1),
(2) Date: Apr. 27, 2015

(87) PCT Pub. No.: WO2014/069503
PCT Pub. Date: May 8, 2014

(65) Prior Publication Data
US 2015/0283730 A1    Oct. 8, 2015

(30) Foreign Application Priority Data

Oct. 30, 2012  (JP) .................................. 2012-238471

(51) Int. Cl.
*B29C 70/44*    (2006.01)
*B29B 11/12*    (2006.01)
(Continued)

(52) U.S. Cl.
CPC ............. *B29B 11/12* (2013.01); *B29B 11/00* (2013.01); *B29B 11/16* (2013.01);
(Continued)

(58) Field of Classification Search
None
See application file for complete search history.

(56) References Cited

U.S. PATENT DOCUMENTS 3,193,437 A * 7/1965 Schafer .................. B29C 70/00
156/245
4,454,005 A * 6/1984 Stofko ................... D21H 21/18
162/12
(Continued)

FOREIGN PATENT DOCUMENTS

JP          5-104643 A    4/1993
JP       2001-71341 A    3/2001
(Continued)

OTHER PUBLICATIONS

International Search Report dated Feb. 4, 2014, in PCT/JP2013/079353, filed Oct. 30, 2013.
(Continued)

*Primary Examiner* — Edmund H Lee
(74) *Attorney, Agent, or Firm* — Oblon, McClelland, Maier & Neustadt, L.L.P.

(57) ABSTRACT

A method of producing a preform, having a step for preparing a sheet-shaped prepreg and a preform mold having a forming surface and a separable portion constituting at least a portion of the forming surface, forming the prepreg using the preform mold, and then removing the preform together with the separable portion from the preform mold.

11 Claims, 12 Drawing Sheets

(51) Int. Cl.
- *B29B 11/00* (2006.01)
- *B29C 70/46* (2006.01)
- *B29C 70/56* (2006.01)
- *B29C 33/00* (2006.01)
- *B29B 11/16* (2006.01)
- *B29C 51/08* (2006.01)
- *B29C 51/14* (2006.01)
- *B29C 51/16* (2006.01)
- *B29C 51/28* (2006.01)
- *B29C 51/42* (2006.01)
- *B29K 63/00* (2006.01)
- *B29K 101/10* (2006.01)
- *B29K 307/04* (2006.01)
- *B29C 35/08* (2006.01)
- *B29C 33/30* (2006.01)

(52) U.S. Cl.
CPC .......... *B29C 33/0016* (2013.01); *B29C 70/44* (2013.01); *B29C 70/46* (2013.01); *B29C 70/56* (2013.01); *B29C 33/306* (2013.01); *B29C 51/082* (2013.01); *B29C 51/14* (2013.01); *B29C 51/16* (2013.01); *B29C 51/28* (2013.01); *B29C 51/421* (2013.01); *B29C 2035/0822* (2013.01); *B29K 2063/00* (2013.01); *B29K 2101/10* (2013.01); *B29K 2307/04* (2013.01); *B29K 2995/0002* (2013.01); *B29K 2995/0015* (2013.01)

(56) References Cited

U.S. PATENT DOCUMENTS

| | | | |
|---|---|---|---|
| 5,204,042 A * | 4/1993 | James | B29C 70/443 264/257 |
| 6,268,047 B1 * | 7/2001 | Mulder | B29C 70/081 428/298.1 |
| 6,558,590 B1 * | 5/2003 | Stewart | B29C 43/183 264/134 |
| 2005/0025967 A1 * | 2/2005 | Lawton | C03C 25/00 428/375 |
| 2005/0253294 A1 | 11/2005 | Takano et al. | |
| 2011/0254189 A1 | 10/2011 | Doyle et al. | |

FOREIGN PATENT DOCUMENTS

| | | |
|---|---|---|
| JP | 2004-002789 | 1/2004 |
| JP | 2006-7492 A | 1/2006 |
| JP | 2006-257399 | 9/2006 |
| JP | 2007-118577 A | 5/2007 |
| JP | 2009-83128 A | 4/2009 |
| JP | 2011-110899 A | 6/2011 |
| WO | WO 2004/018186 A1 | 3/2004 |

OTHER PUBLICATIONS

Office Action dated Sep. 16, 2014, in Japanese Patent Application No. 2013-552039 (with English-language translation).

Office Action issued Dec. 12, 2018 in Indian Patent Application No. 2474/CHENP/2015 (with English translation), filed Apr. 29, 2015, citing documents AO and AP therein, 55 pages.

* cited by examiner

METHOD OF PRODUCING PREFORM

TECHNICAL FIELD

The present invention relates to a method of producing a preform which can be obtained by forming sheet-shaped prepreg into a predetermined shape. In addition, the present invention relates to a method of producing a molded fiber-reinforced resin product from the preform obtained by the above producing method.

This application is based upon and claims the benefit of priority of the prior Japanese Patent application No. 2012-238471, filed on Oct. 30, 2012, the entire contents of which are incorporated herein by reference.

BACKGROUND ART

Conventionally, for example, a technique is known in which a molded fiber-reinforced resin product is produced by heating and pressurizing in a molding die sheet-shaped prepreg manufactured by impregnating reinforcement fibers with an uncured thermosetting resin (for example, see Patent Document 1).

For cases where the molded fiber-reinforced resin product has a three-dimensional shape including a curved surface, a technique is also known in which a preform is produced by forming sheet-shaped prepreg into a shape predetermined in consideration of the shape of the final molded product prior to the main molding process for obtaining a desired molded fiber-reinforced resin product.

As a method of obtaining desired preforms, the following method is known (for example, see Patent Document 2).

(i) Heating a laminate of a plurality of prepreg sheets using an infrared heater.

(ii) Bending the prepreg by sandwiching the heated prepreg between preform molds of a male mold and a female mold.

(iii) Cooling the prepreg by blowing air onto the preform molds.

(iv) Opening the preform molds and taking out the prepreg such that the bent shape is maintained.

In addition, a method is also known in which prepreg heated to a predetermined temperature is arranged in a preform mold having a convex shape and the prepreg is formed while being pressed with a rubber film (for example, see Patent Document 3).

Furthermore, in order to suppress occurrence of wrinkles, a method is also known in which a plurality of pattern-cut sheets of prepreg provided with extension portions in their outer periphery are laminated; the prepreg is formed while tension is imparted by tension imparting units installed in a preform forming machine; the extension portions are cut off after the forming; and thus desired preforms are obtained (for example, see Patent Document 4).

CITATION LIST

Patent Document

Patent Document 1: WO 2004/018186 A
Patent Document 2: JP 2009-83128 A
Patent Document 3: JP 2006-7492 A
Patent Document 4: JP 2011-110899 A

DISCLOSURE OF THE INVENTION

Problem to be Solved by the Invention

However, in order to take out a preform obtained by forming prepreg having strong tack, or prepreg for which a low viscosity resin is used as a matrix, from the preform mold(s) while maintaining the shape thereof, it was necessary to cool the preform by cooling the preform mold or to sufficiently cool the preform by blowing air onto the preform on the preform mold for a long time. When the time required for cooling a preform becomes longer, it takes so much time to produce the preform and the efficiency is significantly reduced. Further, if one tries to remove the preform from the preform mold while the formed prepreg is insufficiently cooled yet, the shape of the preform is significantly distorted. Therefore, there was a problem that shape accuracy of the preform greatly decreased.

Further, in the case of a preform whose complicated shape has been formed while tension was imparted, it takes time to cut off the extension portions of the prepreg obtained after the forming to make a desired shape, and dimension accuracy of the preform decreases.

The present invention has been made in view of the above problems and an object thereof is to provide a method of producing a preform having excellent shape and dimension accuracy with good efficiency. In addition, an object of the present invention is to provide a method of producing a molded fiber-reinforced resin product having excellent strength, appearance, and repetition stability during mass production using the preform produced by the above method.

Means for Solving Problem

A method of producing a preform according to a first aspect of the present invention includes: preparing sheet-shaped prepreg and a preform mold having a forming surface and a separable portion constituting at least a portion of the forming surface; and removing the preform from the preform mold together with the separable portion after forming the prepreg using the preform mold.

The preform mold may be configured of a pair of molds.

One of the pair of molds may solely have the separable portion.

Each mold of the pair of molds may have the separable portion on at least a portion of the forming surface thereof.

For the separable portion, a different material from materials of the preform mold except for the separable portion may be used.

As the material of the separable portion, a material such as a metal or a resin composition may be used.

As the material of the separable portion, a fiber-reinforced composite material, in which a thermosetting resin composition is used, may be used.

The separable portion may have a thickness of 0.5 to 10.0 mm.

A method of producing a molded fiber-reinforced resin product according to a second aspect of the present invention includes: obtaining a preform fixed to the separable portion by the method of producing the preform according to the first aspect; separating the separable portion and the preform from each other after cooling the preform fixed to the separable portion; and molding the preform using a compression molding apparatus.

A method of producing a molded fiber-reinforced resin product according to a third aspect of the present invention includes: obtaining a preform fixed to a separable portion by the method of producing the preform according to the first aspect; and molding the preform integrally with the separable portion using a compression molding apparatus.

The methods of producing a molded fiber-reinforced resin product according to the second and third aspects of the present invention may further include a process of cutting the preform along the outer edge of the separable portion.

Effect of the Invention

In the method of producing a preform according to the first aspect of the present invention, since the preform can be taken out together with the separable portion at the time of removing the preform from the preform mold, it is possible to make the shape and dimension accuracy of the preform excellent and to eliminate the process of cooling the preform before the preform is taken out from the preform mold. Accordingly, the preform can be produced with good efficiency. Moreover, in the method of producing a molded fiber-reinforced resin product according to the aspect of the present invention, it is possible to produce the molded fiber-reinforced resin product having excellent strength, appearance, and repetition stability during mass production from the preform obtained by the method of producing the preform according to the first aspect.

MODE(S) FOR CARRYING OUT THE INVENTION

The method of producing a preform according to a first embodiment of the present invention will be described.

According to the first embodiment of the invention, the method of producing a preform from sheet-shaped prepreg using a preform mold includes a process in which, after the prepreg is formed using a preform mold having a forming surface and a separable portion constituting at least a portion of the forming surface, the preform is removed together with the separable portion.

(Arrangement of Prepreg)

Figure 1:
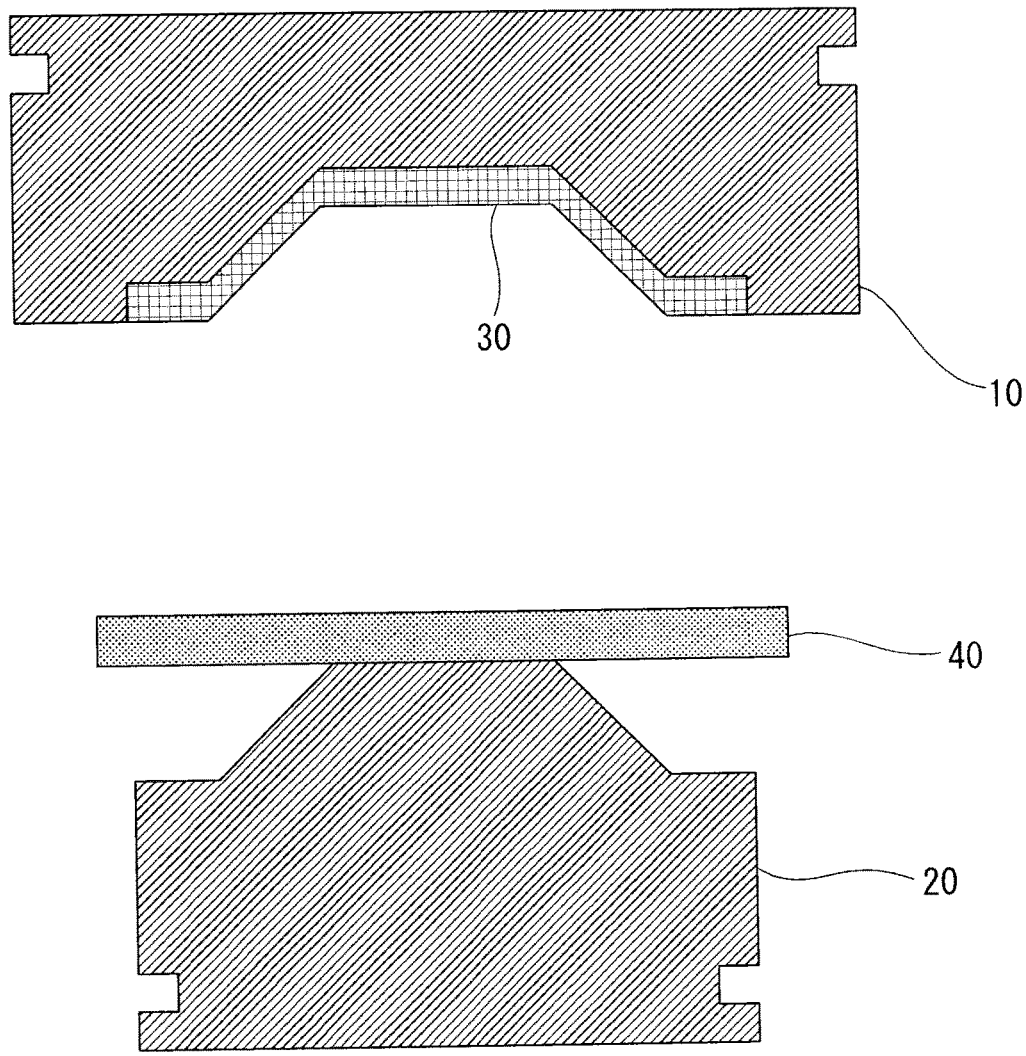
FIG. 1 illustrates one process in a method of producing a preform according to an embodiment of the present invention.

As illustrated in FIG. 1, prepreg 40 is arranged on the lower mold of preform molds in which a separable portion 30 is provided on at least a portion of a forming surface of the preform molds. The female mold 10 has the separable portion 30 in FIG. 1, but without being limited thereto, the male mold 20 may have a separable portion 30 and both of the female mold 10 and the male mold 20 may have a separable portion 30, respectively.

Using the separable portion 30 provided for the female mold 10 is preferred because the separable portion 30 is easily detached from the female mold 10 after a forming process and it is also preferred because extension portions are easily cut off, for example, in the cutting process of the extension portions of the formed prepreg 40.

(Preform Mold)

A preform mold capable of being used in the method of producing a preform according to this embodiment has a shape corresponding to a predetermined shape of the preform in the portion where the separable portion 30 is not provided as the forming surface (contact surface with the prepreg) thereof. Further, in the portion of the preform mold where the separable portion 30 is provided, the outer surface of the separable portion 30 has the shape corresponding to a desired shape of the preform obtained after the forming. That is, the preform mold according to the embodiment of the present invention may be configured such that the prepreg 40 is formed into a desired shape by coming in contact with the forming surface of the preform mold including the outer surface of the separable portion 30 when a pressure is applied in a state where the preform is sandwiched with the preform molds.

In FIG. 1, a pair of molds is used as preform molds, that is, a female mold 10 is used as an upper mold and a male mold 20 is used as a lower mold, but is not limited thereto, and the female mold 10 and the male mold 20 may be reversely arranged. In addition, one of the female mold 10 and the male mold 20 may be a stationary mold, and the other may be a movable mold; and both of them may be movable molds.

Materials of the preform mold capable of being used in the method of producing the preform according to this embodiment are not particularly limited to metals, chemical woods, or the like as long as being used to form prepreg into preforms, but the chemical woods are preferred because the material is inexpensive and easily workable.

(Separable Portion of Preform Mold)

A separable portion 30 capable of being used in the method of producing a preform according to this embodiment can be configured to easily open the mold without distorting the shape of the formed prepreg 40 and to be easily removed from a preform mold body (detachable from the mold body) together with the formed prepreg 40. The shape of the separable portion 30 should be a shape in which the surface thereof coming in contact with the prepreg 40 corresponds to the desired shape of the prepreg 40 to obtain after the forming process.

At least a portion of the forming surface of the preform mold having a separable portion 30 is the forming surface of the separable portion 30. In order to remove the preform together with the separable portion 30 while maintaining high dimension accuracy of the preform, the separable portion 30 is preferably arranged corresponding to bent portions and outer edge portions of the preform. Moreover, the separable portion 30 is preferably arranged on one surface of the preform as each portion of it is integrated continuously with each other. More preferably, the separable portion 30 corresponding to one surface of the preform covers the entire of the one surface of the preform.

Making the outer edge shape of the separable portion 30 match the outer edge shape of the preform is preferred because protruding portions of the formed prepreg are cut off along the outer edge of the separable portion 30 and thus a preform having a complicated shape can be obtained with good accuracy.

Furthermore, in a case where the preform mold configured of a pair of molds is used as the preform mold, the separable portion 30 of the preform mold may be provided for at least one mold of the pair of molds from the viewpoint of the easy opening of the mold and keeping the shape of the prepreg 40. In addition, when each mold of the pair of molds is provided with a0 separable portion 30, the detachment from the preform mold configured of the pair of molds can be more easily performed.

As materials of the separable portion 30 of the preform mold, a metal or a resin composition such as a thermosetting resin composition or a thermoplastic resin composition can be used, as far as the material is not deformed at the temperature at which the prepreg 40 is formed into the shape of the preform. More preferably, the material of the separable portion 30 is a fiber-reinforced composite material using the thermosetting resin composition in terms of its high specific strength & specific rigidity and being capable of producing larger-sized preform and while being easily produced.

Examples of methods of producing the separable portion made of a fiber-reinforced composite material include a method of forming and curing UD prepreg (unidirectional prepreg) in which reinforcement fibers are aligned in one direction, or fabric prepreg in which the reinforcement fibers are woven, into the predetermined shape; or a method of forming various fabrics of the reinforcement fibers, mats, or non-crimped fabrics into the predetermined shape and then curing after impregnating them with a resin composition, but are not particularly limited thereto. The method of producing the separable portion may be suitably selected according to the desired shape.

Examples of the reinforcement fibers capable of being used in the fiber-reinforced composite material include carbon fibers, glass fibers, aramid fibers, high-strength polyester fibers, boron fibers, alumina fibers, silicon nitride fibers, and nylon fibers, but the glass fibers are preferred from the viewpoint of physical properties and cost.

Examples of the thermosetting resins capable of being used in the fiber-reinforced composite material include epoxy resins, unsaturated polyester resins, acrylic resins, vinyl ester resins, phenolic resins, and benzoxazine resins, but the unsaturated polyester resins are preferred from the viewpoint of physical properties and cost. The thermosetting resins may contain various additives such as a curing agent, a mold releasing agent, a defoaming agent, an ultraviolet absorbing agent, and a filling material.

The thickness of the separable portion 30 for the preform mold is preferably 0.5 to 10.0 mm and more preferably 1.0 to 5.0 mm. When the thickness of the separable portion is less than 0.5 mm, the thickness is possible to be so thin that it is difficult to maintain the shape of the preform, and when the thickness of the separable portion is more than 10.0 mm, the separable portion 30 may become so heavy as is difficult to handle it at the time of, for example, forming a large-sized shape in particular.

(Prepreg)

The size of the prepreg 40 capable of being used in the method of producing a preform according to this embodiment may be larger than the desired preform and may be larger or smaller than the separable portion 30.

The material of the prepreg 40 may be UD prepreg in which the reinforcement fibers are aligned in one direction and may be fabric prepreg in which the reinforcement fibers are woven.

The shape of the prepreg 40 may be appropriately selected and may be cut out (pattern-cut) according to the shape of the desired preform.

Examples of the reinforcement fibers capable of being used in the prepreg 40, which can be used in the method of producing a preform according to this embodiment, include carbon fibers, glass fibers, aramid fibers, high-strength polyester fibers, boron fibers, alumina fibers, silicon nitride fibers, and nylon fibers. Among these reinforcement fibers, the carbon fibers are preferred in terms of having excellent specific strength and specific elasticity.

Examples of the thermosetting resins capable of being used in the prepreg 40, which can be used in the method of producing a preform according to this embodiment, include epoxy resins, unsaturated polyester resins, acrylic resins, vinyl ester resins, phenolic resins, and benzoxazine resins. Among these thermosetting resins, the epoxy resins are preferred in terms of obtaining high strength after the curing. Moreover, the thermosetting resins may contain various additives such as a curing agent, a mold releasing agent, a defoaming agent, an ultraviolet absorbing agent, and a filling material as needed.

As a prepreg 40 capable of being used in the method of producing a pre-form according to this embodiment, a prepreg-laminated body obtained by laminating several times of one sheet (single layer) of prepreg. The number of the laminated sheets in the laminated body is preferably 2 to 30 sheets. When the number of the laminated sheets of the prepreg 40 is two sheets or more, it is possible to obtain a molded product having sufficient strength. In addition, when the number of the laminated sheets of the prepreg is 30 sheets or less, it is possible to reduce the cost necessary for the lamination. Further, in the case of laminating the prepreg, orientations of the reinforcement fibers included in each of the sheets of prepreg can be variously combined (hereinafter, for convenience of explanation, the "prepreg-laminated body" is also referred to as "prepreg").

(Preheating of Prepreg)

(Heating Machine)

Figure 2:
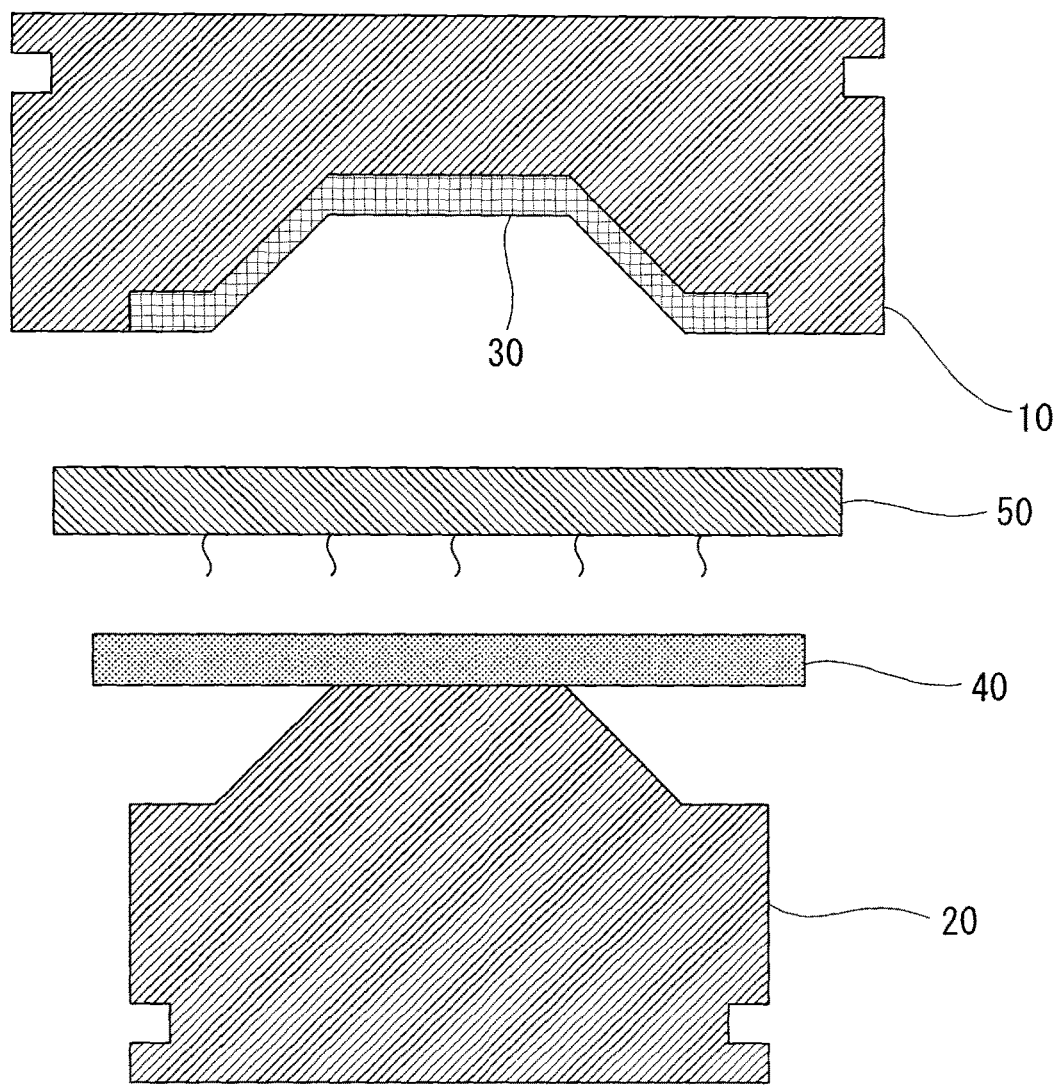
FIG. 2 illustrates one process in the method of producing the preform according to the embodiment of the present invention.

In the method of producing a preform according this embodiment, as illustrated in FIG. 2, the prepreg 40 may be preheated by using a heating machine 50 before the forming of the prepreg.

The heating machine 50 heats the prepreg 40 before the forming to soften it. Examples of heating methods include a hot-air blow method and an infrared radiation method, but the infrared radiation method is preferred in terms of shortening heating time. The heating machine 50 is located on the top of the prepreg 40 only during heating the prepreg 40 and is arranged so as not to interfere with the operation of the preform mold in the other time.

The heating machine 50 preferably can preheat the prepreg 40 to a temperature of 40 to 80° C. The temperature of the prepreg 40 is 40° C. or higher is preferable, because the prepreg can be easily molded into a predetermined shape; and 80° C. or lower is preferable, because curing of the prepreg at the time of producing a preform can be prevented.

(Forming)

Figure 3:
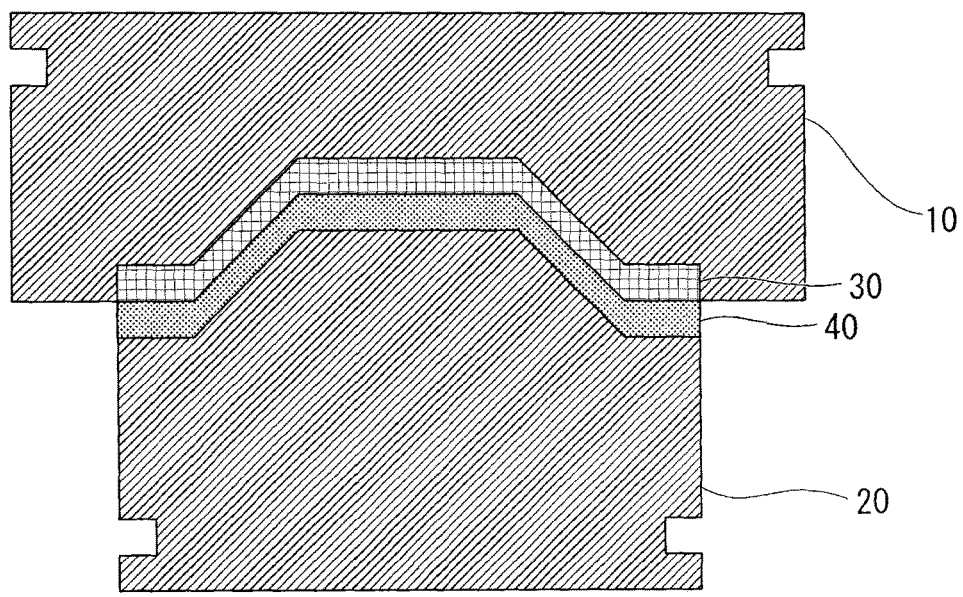
FIG. 3 illustrates one process in the method of producing the preform according to the embodiment of the present invention.

The forming is performed in such a manner that after the prepreg 40 arranged on the lower mold (male mold 20) is preheated, as illustrated in FIG. 3, the space between the lower mold and upper mold (female mold 10) is closed and a pressure is applied to the prepreg 40 with the male mold 20 and the female mold 10 in the closed state so that the prepreg 40 comes in contact with the separable portion 30 of the preform mold. The pressure applied at the time of forming the prepreg 40 is preferably 0.01 to 0.10 MPa. When the pressure of 0.01 MPa or more is applied, the prepreg can be easily molded into a predetermined shape of the preform, and when the pressure of 0.10 MPa or less is applied, it is possible to simplify the apparatus for producing a preform. In cases where the preheating process is not necessary, the preheating process can be appropriately omitted.

(Removal of Preform)

Figure 4:
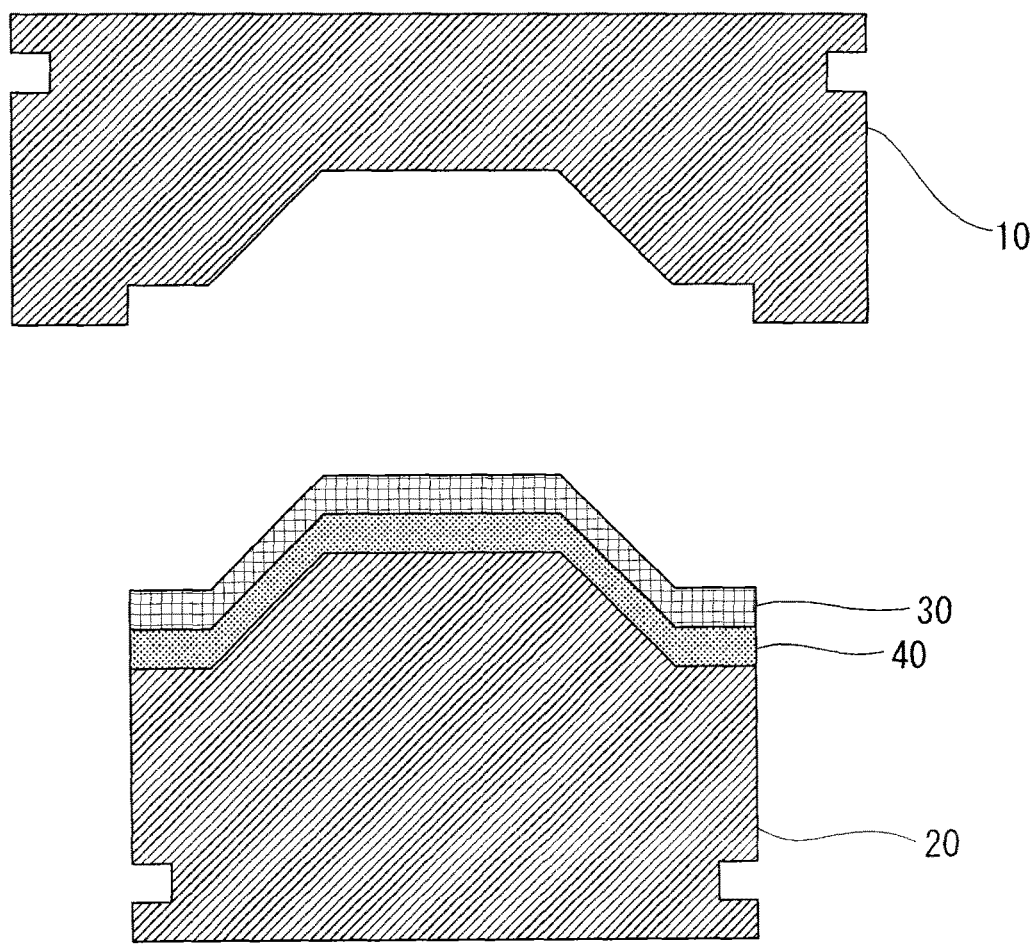
FIG. 4 illustrates one process in the method of producing the preform according to the embodiment of the present invention.
Figure 5:
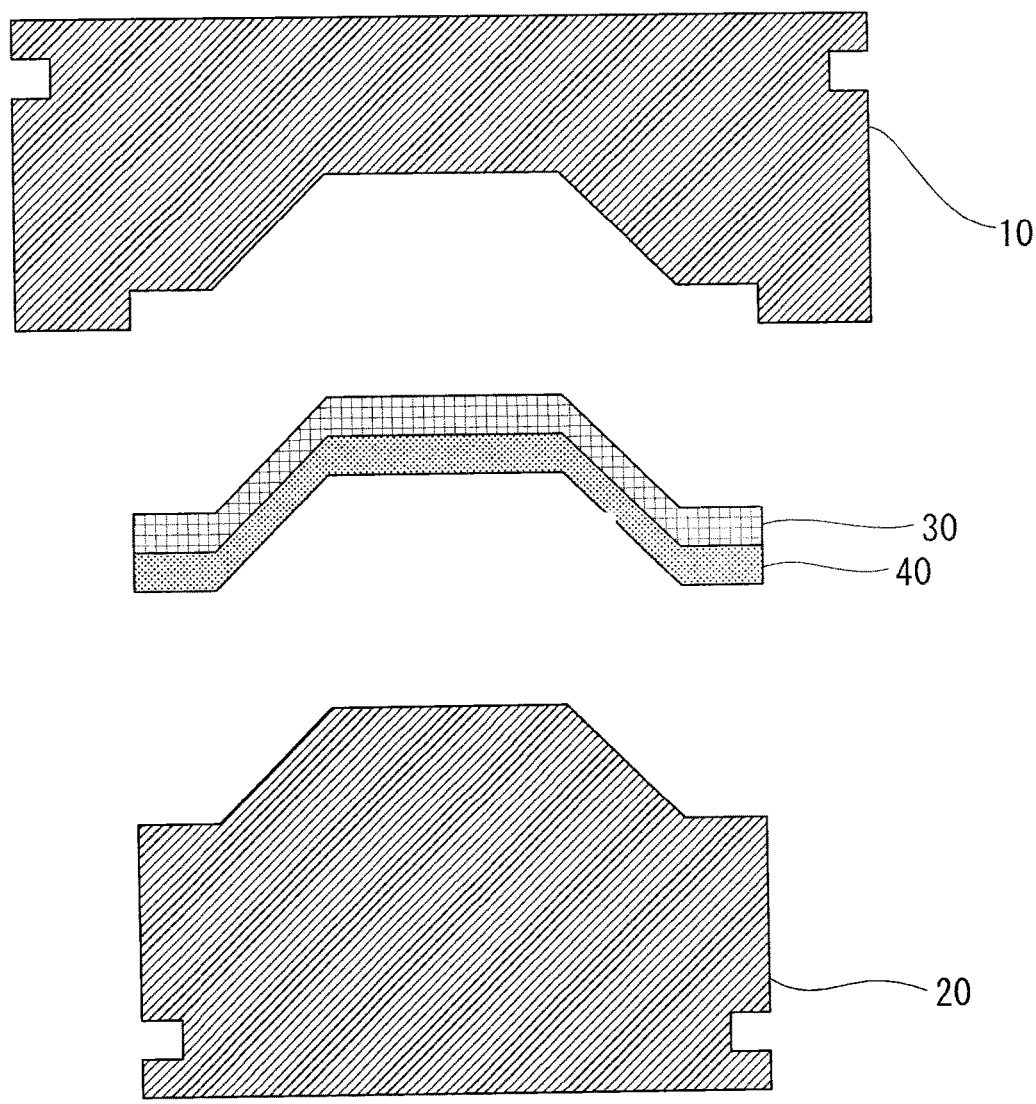
FIG. 5 illustrates one process in the method of producing the preform according to the embodiment of the present invention.

After the forming of the prepreg 40, the space between the lower mold and the upper mold is opened as illustrated in FIG. 4, the formed prepreg 40 is removed from the preform mold together with the separable portion 30 as illustrated in FIG. 5. After the prepreg is removed from the preform mold in this way, the preform fixed to the separable portion 30 can be also cooled. Thus, by taking out the preform together with the separable portion, the shape of the preform is maintained by the separable portion. Accordingly, before being removed from the preform mold, the preform does not need to be subjected to a cooling process. Moreover, by preparing a plurality of separable portions, since the following preform can be produced while cooling the prior preforms, the time required for a producing process can be significantly reduced. Moreover, the obtained preform is placed in a molding die adjusted at a predetermined temperature and is subjected to compression molding, so that a molded fiber-reinforced resin product can be obtained. If it is necessary to cut off the outer edge portions of the preform prior to the compression molding, by making the outer edge shape of the separable portion 30 be the shape of the preform obtained after the outer edge portions have been cut off and by cutting off the outer edge along the outer edge of the separable portion 30, the outer edge portions can be efficiently cut off with good accuracy.

In the case of using this embodiment, the preform may be placed in the molding die for compression molding after being separated from the separable portion 30 and be subjected to the compression molding. The preform may be placed in the molding die for compression molding while being fixed to the separable portion 30, and the separable portion is removed, so that the preform can be subjected to the compression molding.

In addition, it is also possible to obtain the molded fiber-reinforced product in such a manner that the preform is placed in the molding die for the compression molding in the state where the preform is fixed to the separable portion 30 and the separable portion 30 and the preform are integrally molded.

Figure 6:
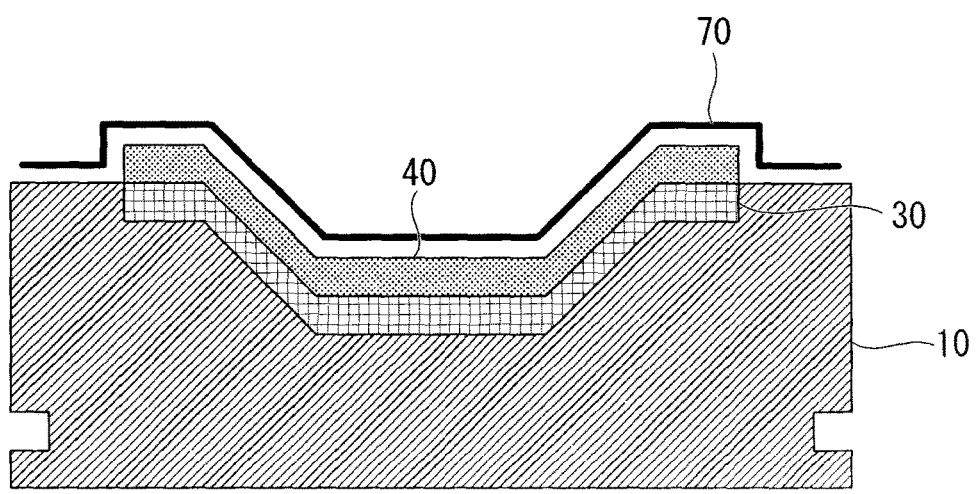
FIG. 6 illustrates one process in the method of producing a preform according to the embodiment of the present invention.

A method of producing a preform according to a second embodiment of the present invention is a method of forming the prepreg in such a manner that after the prepreg of a predetermined temperature is arranged in the preform mold having a separable portion in at least a portion of a forming surface, the prepreg is covered with a rubber film, the rubber film is pressed against the prepreg and the preform mold at an atmospheric pressure using vacuum drawing, and the prepreg sandwiched between the rubber film and the preform mold is formed. Specifically, for example, the prepreg 40 arranged between the rubber film 70 and the female mold 10 is formed using the female mold 10 having the separable portion 30 in the preform mold in such a manner that the prepreg 40 is arranged on the female mold; as illustrated in FIG. 6, after the prepreg 40 is heated as needed, the prepreg 40 is covered with a rubber film 70; and a space between the rubber film 70 and the female mold 10 is subjected to the vacuum drawing so that the rubber film 70 is pressed against the female mold 10 by the atmospheric pressure. The formed prepreg 40 can be easily removed without distorting the shape obtained by the forming in a state of being fixed to the separable portion 30.

Since others are the same as in the first embodiment, details will be omitted.

In addition, a method of producing a preform according to a third embodiment of the present invention will be described. In the first embodiment, the preform molds form the prepreg by compression only. However, when it is necessary to suppress the occurrence of wrinkles in forming a deep-drawn shape, the occurrence of wrinkles can be avoided in such a manner that extension portions are provided in outer periphery of the pattern cur prepreg; a pressure is applied to the prepreg sandwiched by the preform molds while tension is imparted to the extension portions using a tension imparting apparatus installed in the preform molding machine; and thus the prepreg is formed. Thereafter, the extension portions described above are cut off and thus it is possible to obtain the preform having the desired shape.

Figure 7:
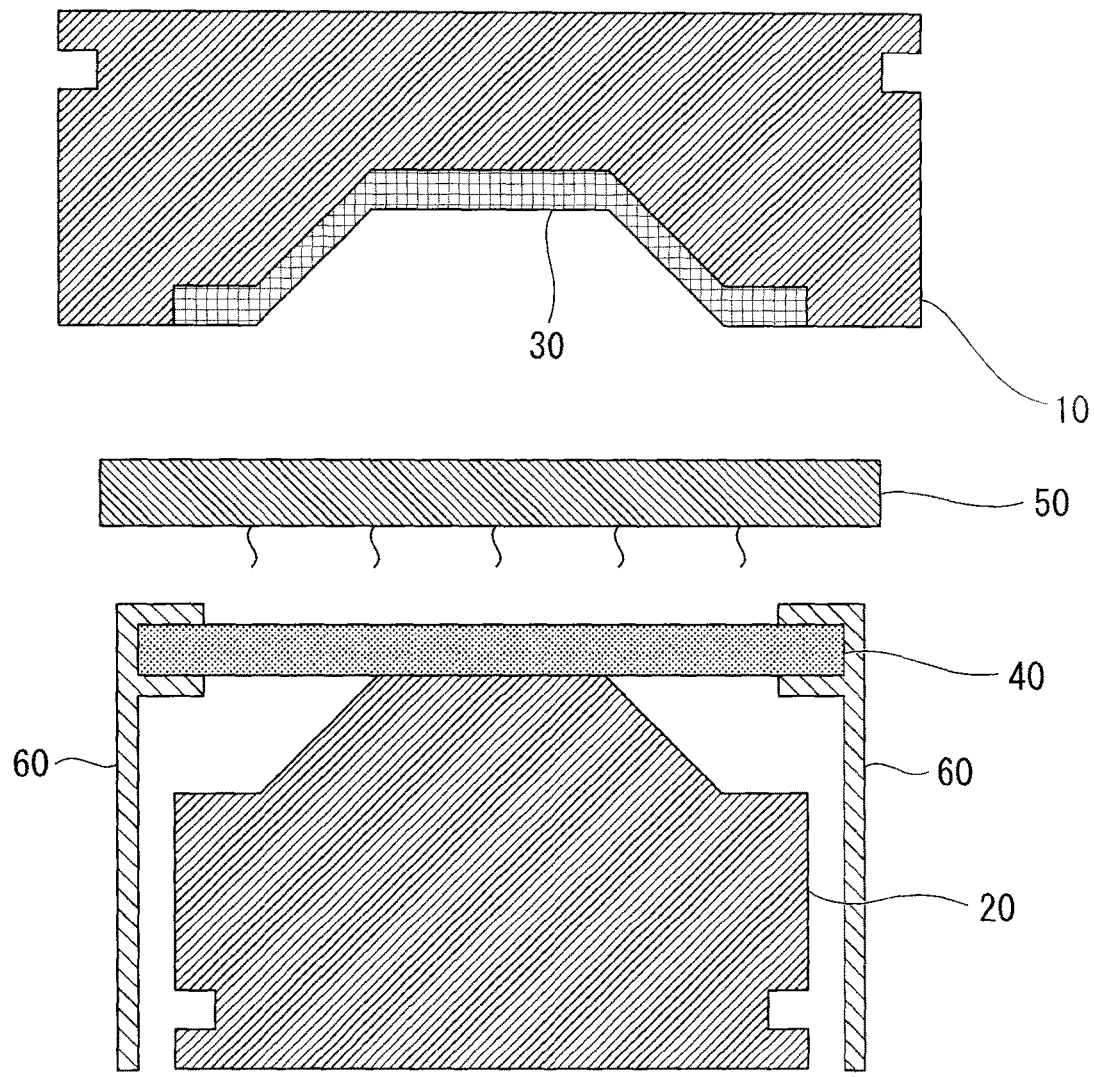
FIG. 7 illustrates one process in the method of producing a preform according to the embodiment of the present invention.
Figure 8:
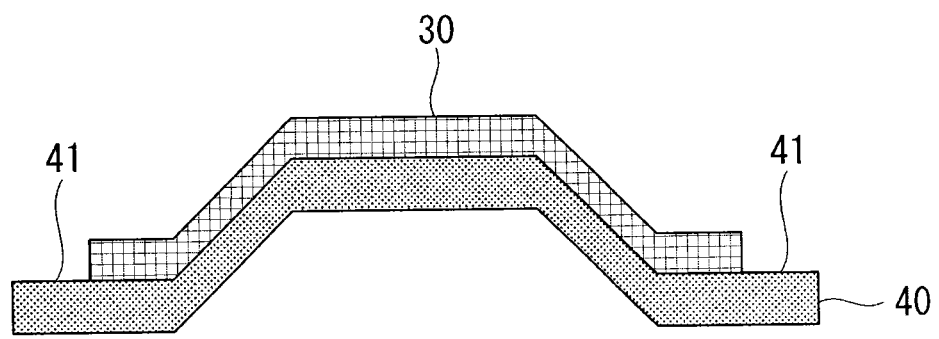
FIG. 8 illustrates one process in the method of producing the preform according to the embodiment of the present invention.

Also in the third embodiment, as illustrated in FIG. 7, for at least one side of the preform molds, a mold having a separable portion 30 in at least a portion of the forming surface is used, and the prepreg 40 partially provided with the extension portions is arranged on the lower mold. After heated with the heating machine 50 while being gripped by the tension imparting apparatus 60 installed in the preform molding machine, the preform molds are closed while the extension portions are tensioned by the tension imparting apparatus 60, the pressure is applied to the prepreg 40 sandwiched by the preform molds, and thus the prepreg 40 is formed. Thereafter, the tension of the tension imparting apparatus 60 imparted to the prepreg 40 is released, the preform molds are opened, and the formed prepreg 40 is taken out in the state of being fixed to the separable portion 30. When the preform and the separable portion 30 are in an integrated state, as illustrated in FIG. 8, it is possible to cut off the extension portions 41 of the prepreg 40 along the outer edge of the separable portion 30. Accordingly, even when the preform has a complicated shape, it is possible to obtain the preform having high dimension accuracy.

Since others are the same as in the first embodiment, details will be omitted.

Figure 9:
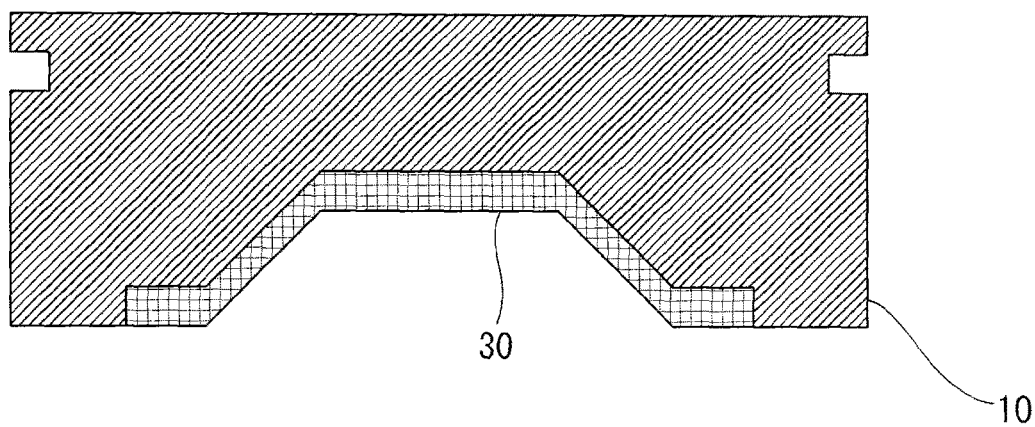
FIG. 9 illustrates one process in the method of producing a preform according to the embodiment of the present invention.
Figure 9:
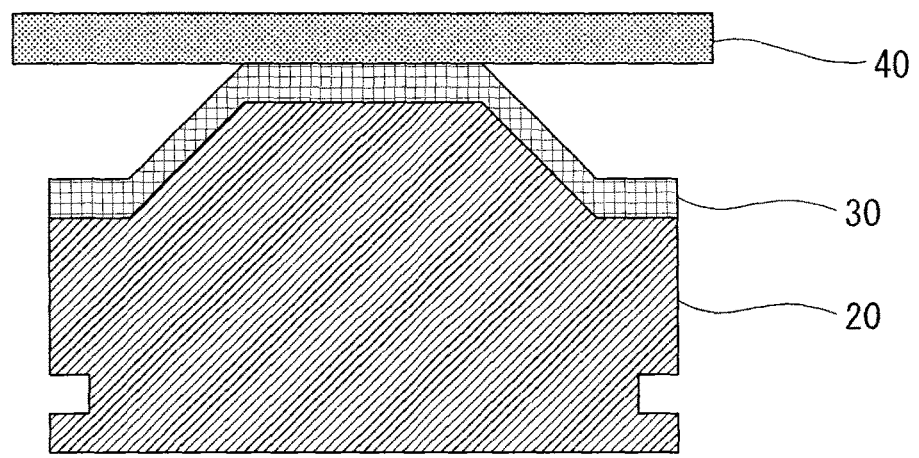

In addition, as illustrated in FIG. 9, when the entire forming surface of the preform molds is the separable portion 30, the molds can be easily opened without waiting for the cooling time of the prepreg even for any prepreg having any tack and softness. In addition, since the prepreg 40 can be removed in the state of being fixed to the separable portion 30, it is also possible to easily remove it from the preform molding machine without distorting the already-formed shape.

For all the methods of producing the preform according to any of the embodiments described above, the obtained preform can be cooled until just before being subjected to compression molding using a molding die while maintaining the shape thereof with the separable portion 30. As described above, the sufficiently cooled preform can be easily separated from the separable portion 30 and can be used for the compression molding while maintaining high shape accuracy. As such, for the methods of producing a preform according to the present invention, the shape and the dimension accuracy of the preform can be good and the production efficiency can be also excellent.

EXAMPLES

Hereinafter, the present invention will be described in more detail with reference to Examples. However, the present invention is not limited to Examples.

Example 1

A commercially available glass mat was impregnated with an unsaturated polyester resin and then was cured under heating and pressure, thereby a separable portion having a thickness of about 1.5 mm was prepared.

On the other hand, a commercially available chemical wood was subjected to a cutting work, thereby a pair of preform molds are prepared. At this time, the shape of the surface corresponding to the forming surface of the female mold was cut more deeply by the thickness of the separable portion from the finally desired shape of the preform and thus the desired female mold surface was obtained in the state where the separable portion was installed. Thereafter, the female mold 10 provided with the separable portion 30 was arranged as the movable mold in the upper mold of the preform molding machine and the male mold 20 was arranged as the stationary mold in the lower mold thereof as illustrated in FIG. 1.

Subsequently, a prepreg sheet obtained by heating and impregnating carbon fibers with an epoxy resin composition was cut into the shape required for the preform, and ten sheets of the prepreg were laminated such that the carbon fibers were layered to have mutually orthogonal orientations, thereby obtaining a prepreg-laminated body (hereinafter, "prepreg-laminated body" is also referred to as "prepreg" for convenience of explanation). The obtained prepreg 40 was arranged on the male mold 20.

Thereafter, as illustrated in FIG. 2, an infrared heater (heating machine 50) was arranged between the prepreg 40 and the female mold 10, and the prepreg 40 was heated and softened to about 60° C. by the heating machine. Subsequently, the female mold 10 was lowered after the retreat of the heating machine 50, and thus the prepreg 40 was compressed between the male mold 20 and the separable portion 30 on the female mold side as illustrated in FIG. 3. Thereafter, the female mold 10 was raised as illustrated in FIG. 4, and the prepreg 40 (preform) obtained after the forming was removed in the state of being fixed to the separable portion 30 from the male mold 20 as illustrated in FIG. 5. At this time, since the prepreg 40 obtained after the forming was integrated with the separable portion 30, it was easily removed from the male mold 20 without distorting the shape thereof.

The formed prepreg 40 obtained was cooled together with the separable portion 30 until just before being subjected to the compression molding by the compression molding apparatus, and then the separable portion 30 and the formed prepreg 40 obtained were separated from each other. The separation was easily performed, and the formed prepreg after the separation was a preform having good shape accuracy.

The preform was placed in the lower mold for compression molding which has been adjusted at the predetermined temperature, and the preform placed in the lower mold was sandwiched by the upper mold and then was subjected to heating and pressure, thereby obtaining a molded fiber-reinforced resin product. The obtained molded product had excellent strength and appearance, and excellent repetition stability during mass production was obtained.

Example 2

Figure 10:
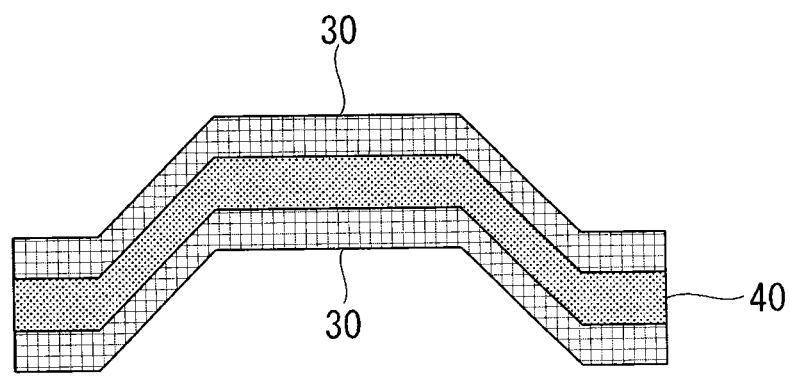
FIG. 10 illustrates one process in the method of producing the preform according to the embodiment of the present invention.

As illustrated in FIGS. 9 and 10, the preform was produced in the same manner as in Example 1 except that not only the female mold 10 but also male mold 20 was the preform mold having a separable portion. The shape of the surface corresponding to the forming surface of the male mold 20 was cut to be reduced by the thickness of the separable portion from the finally-desired forming shape of the prepreg.

In Example 2, the opening of the mold and the demolding were easy in the production of the preform. The prepreg 40 taken out from the separable portion 30 was a preform having excellent shape accuracy. In addition, the molded product obtained by compression molding the preform in the same manner as in Example 1 had excellent strength and appearance, and excellent repetition stability during mass production was obtained.

Example 3

As illustrated in FIG. 6, the prepreg 40 was arranged on the female mold 10 which was provided with the separable portion 30 similar to the apparatus used in Example 1, and the prepreg 40 was heated in the same manner as in Example 1. Thereafter, the space between the rubber film 70 and the female mold 10 was subjected to the vacuum drawing, so that the prepreg 40 was formed while the rubber film 70 was pressed against the female mold 10 through the prepreg 40 by the atmospheric pressure.

After the forming, the rubber film was removed by releasing the vacuum, and the prepreg 40 was removed together with the separable portion 30. The removal was easily performed. The prepreg 40 separated from the separable portion 30 after being cooled together with the separable portion 30 was a preform having excellent shape accuracy. In addition, the molded product obtained by compression molding the preform in the same manner as in Example 1 had excellent strength and appearance and, excellent repetition stability during mass production was obtained.

Example 4

As illustrated in FIG. 7, the prepreg 40 was formed in the same manner as in Example 1 except that a prepreg 40 provided with the extension portions in a portion of the outer periphery of the prepreg used in Example 1 was used and that the pressure was applied to the prepreg 40 sandwiched by the preform molds while the tension was imparted to the extension portions by the tension imparting apparatus 60 installed in the preform molding machine. The work of opening the molds and removing the prepreg 40 together with the separable portion 30 was easily performed. The extension portions 41 of the prepreg 40 were cut off with excellent dimension accuracy using a knife along the separable portion 30. In addition, the prepreg 40 separated from the separable portion 30 after being cooled together with the separable portion 30 was a preform having excellent shape accuracy. In addition, the molded product obtained by compression molding the preform in the same manner as in Example 1 had excellent strength and appearance, and excellent repetition stability during mass production was obtained.

Comparative Example 1

Figure 11:
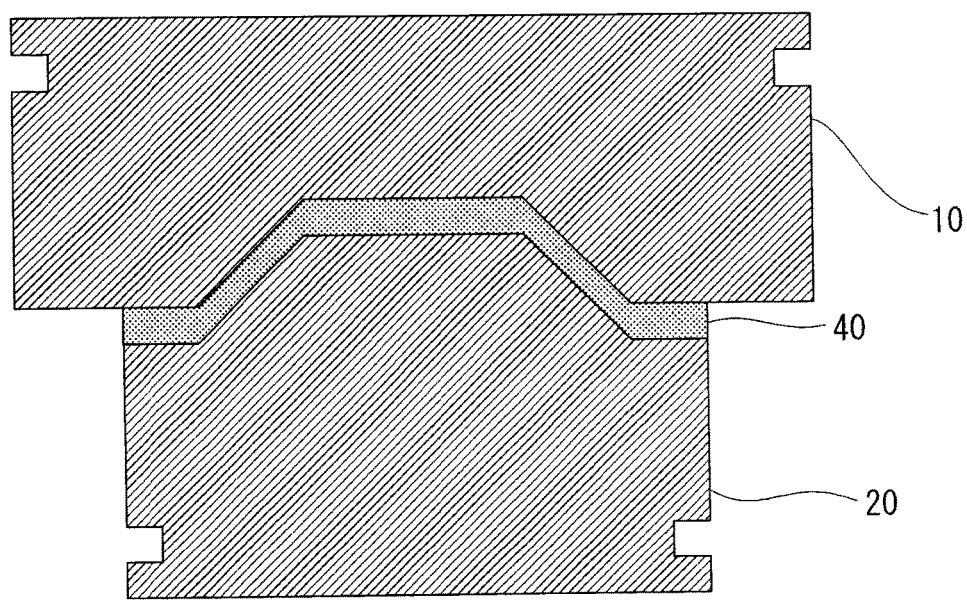
FIG. 11 illustrates one process in a method of producing a preform according to a prior art.

A preform was produced in the same manner as in Example 1 except that a pair of preform molds not having a separable portion were used and that, after the prepreg 40 was sandwiched to be bent between a male mold 20 and female mold 10 as illustrated in FIG. 11, the prepreg 40 was cooled by blowing air onto the preform mold. In Comparative Example 1, unless after blowing air onto the prepreg 40 for a long time, the prepreg was adhered to the preform molds and thus the molds could not be opened. In addition, the shape of the prepreg 40 was distorted at the time of detaching the mold and thus the obtained preform had poor shape accuracy. In addition, the molded product obtained by compression molding the preform in the same manner as in Example 1 had poor strength and appearance, and the repetition stability during mass production was lacked.

Comparative Example 2

Figure 12:
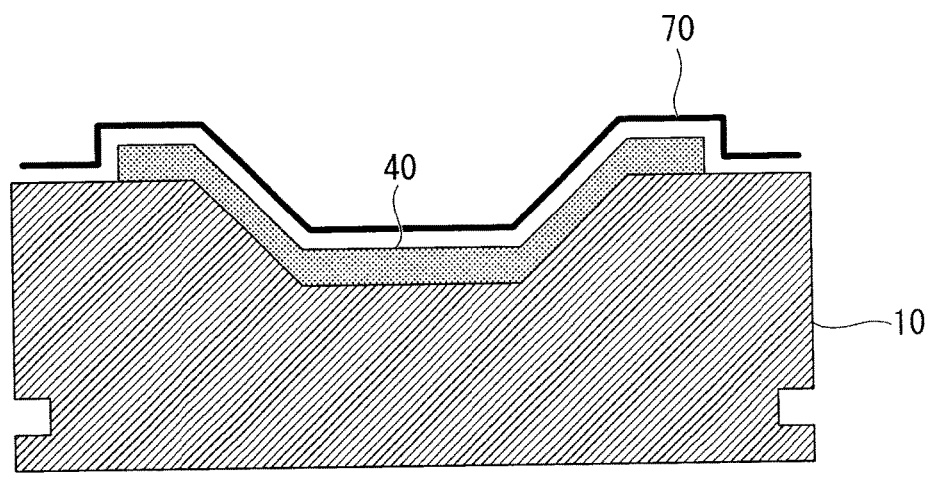
FIG. 12 illustrates one process in the method of producing the preform according to the prior art.

As illustrated in FIG. 12, a preform was produced in the same manner as in Example 3 except that a female mold not having a separable portion was used. In the production, the shape of the prepreg 40 was distorted at the time of detaching the mold, and thus the obtained preform had poor shape accuracy. In addition, the molded product obtained by compression molding the preform in the same manner as in Example 1 had poor strength and appearance, and repetition stability during mass production was lacked.

Comparative Example 3

Figure 13:
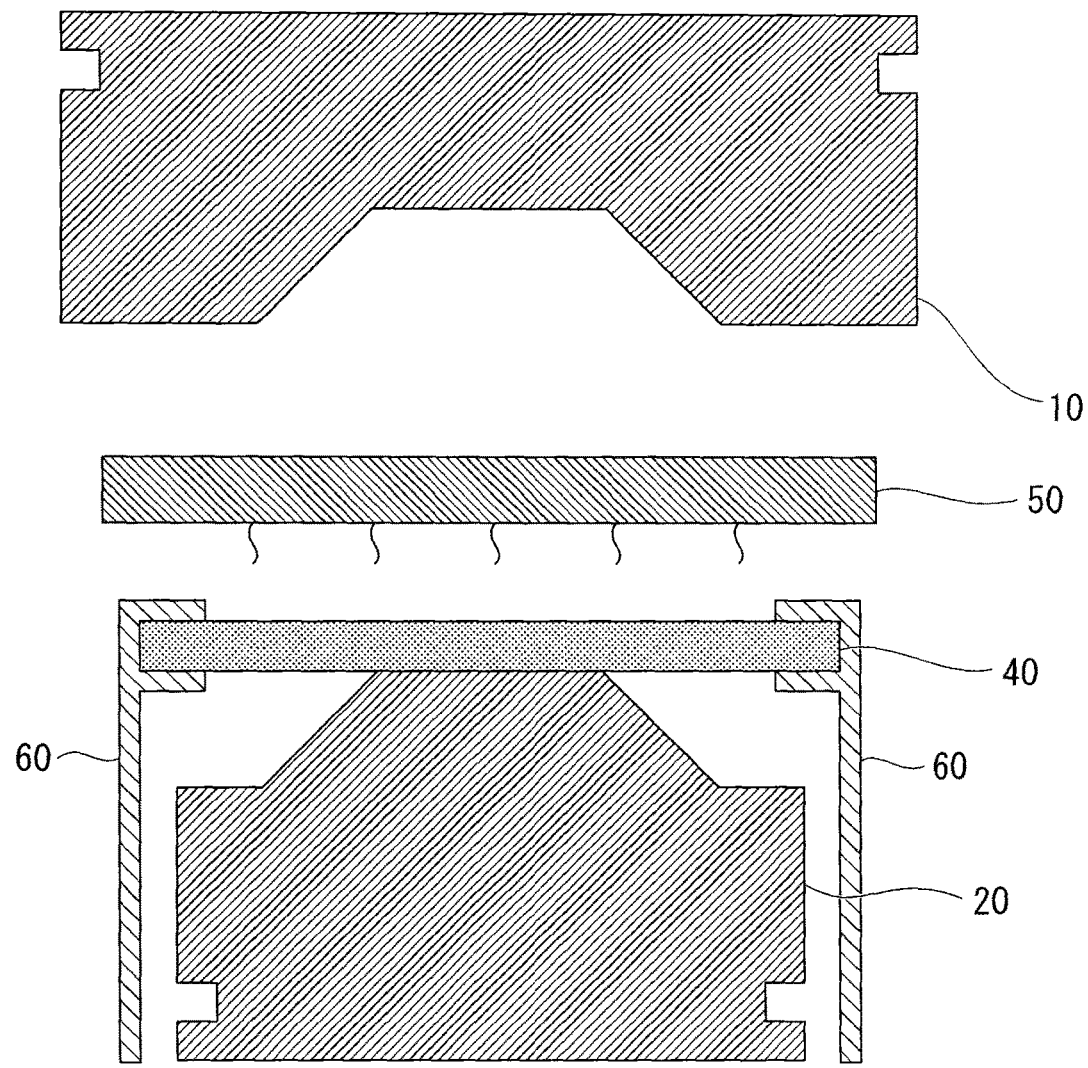
FIG. 13 illustrates one process in the method of producing a preform according to a prior art.

As illustrated in FIG. 13, a preform was produced in the same manner as in Example 4 except that the preform molds used in Comparative Example 1 was used. Unless after blowing air onto the prepreg for a long time, the prepreg was adhered to the preform molds and thus the molds could not be opened. In addition, the shape of the prepreg 40 was distorted at the time of removing the formed prepreg 40 from the preform mold and thus a preform having poor shape accuracy was obtained. In addition, when a surplus portion of the preform was cut using a knife, the preform was deformed by a pushing pressure of the knife and thus was not cut into the desired shape, resulting that the preform had poor dimension accuracy.

In addition, the molded product obtained by compression molding the preform in the same manner as in Example 1 had poor strength and appearance, and repetition stability during mass production was lacked.

EXPLANATIONS OF LETTERS OR NUMERALS

10 female mold
20 male mold
30 separable portion
40 prepreg
41 extension portion (surplus portion) of prepreg
50 heating machine
60 tension imparting apparatus
70 rubber film

The invention claimed is:

1. A method of producing a preform, the method comprising:
situating a sheet-shaped prepreg comprising reinforcement fibers and at least one resin into a preform mold having a forming surface and a separable portion constituting at least a portion of the forming surface; and
removing the preform from the preform mold together with the separable portion after forming the prepreg with the preform mold,
wherein the separable portion is formed of a material that is not deformed at a temperature at which the prepreg is formed into the shape of the preform.

2. The method of producing a preform according to claim 1, wherein the material of the separable portion comprises a different material from materials of the preform mold.

3. The method of producing a preform according to claim 1, wherein the prefoim mold is configured as a pair of molds.

4. The method of producing a preform according to claim 3, wherein the separator portion is situated in only one of the pair of molds.

5. The method of producing a preform according to claim 3, wherein each of the pair of molds has the separable portion on at least a portion of the forming surface thereof.

6. The method of producing a preform according to claim 1, wherein the material of the separable portion is a metal or a resin composition.

7. The method of producing a preform according to claim 6, wherein the material of the separable portion is a resin composition, which is a thermosetting resin comprising a fiber-reinforced composite material.

8. The method of producing a preform according to claim 7, wherein the separable portion has a thickness of 0.5 to 10.0 mm.

9. The method of producing a prefonn according to claim 1, wherein the method does not comprise cooling of the prefoiin prior to the removing of the preform from the preform mold.

10. The method of producing a preform according to claim 7, wherein the thermosetting resin composition comprises at least one selected from the group consisting of an epoxy resin, an unsaturated polyester resin, an acrylic resin, a vinyl ester resin, a phenolic resin and a benzoxazine resin.

11. The method of producing a preform according to claim 7, wherein the thermosetting resin composition comprises unsaturated polyester resins.

* * * * *